us008307968B2

United States Patent
Yamane

(10) Patent No.: US 8,307,968 B2
(45) Date of Patent: Nov. 13, 2012

(54) ONE-WAY CLUTCH

(75) Inventor: Shinji Yamane, Nara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 748 days.

(21) Appl. No.: 12/311,735

(22) PCT Filed: Oct. 11, 2007

(86) PCT No.: PCT/JP2007/069864
§ 371 (c)(1),
(2), (4) Date: Apr. 10, 2009

(87) PCT Pub. No.: WO2008/044738
PCT Pub. Date: Apr. 17, 2008

(65) Prior Publication Data
US 2010/0025182 A1    Feb. 4, 2010

(30) Foreign Application Priority Data

Oct. 13, 2006   (JP) .................. P2006-279429

(51) Int. Cl.
*F16D 41/07* (2006.01)
*F16D 41/00* (2006.01)
(52) U.S. Cl. ................ 192/45.1; 192/41 A; 192/107 M; 192/107 T
(58) Field of Classification Search .................. 192/45.1, 192/41 A, 107 M, 107 T
See application file for complete search history.

(56) References Cited

U.S. PATENT DOCUMENTS

| 5,415,258 A | * | 5/1995 | Numata ........................ 192/41 A |
| 6,394,249 B1 | * | 5/2002 | Tazumi et al. ................... 192/45 |
| 7,143,881 B2 | * | 12/2006 | Ichihara et al. .................. 192/45 |
| 7,584,831 B2 | * | 9/2009 | Takasu .......................... 192/45.1 |
| 2006/0046890 A1 | | 3/2006 | Aikawa |

FOREIGN PATENT DOCUMENTS

| DE | 10124740 A1 | 11/2001 |
| GB | 852236 A | 10/1960 |
| JP | 2001-330062 | 11/2001 |
| JP | 2004-60851 | 2/2004 |
| JP | 2006-97891 | 4/2006 |
| JP | 2006-132649 | 5/2006 |
| JP | 2006-138384 | 6/2006 |
| JP | 2006-170372 | 6/2006 |

OTHER PUBLICATIONS

European Search Report issued Nov. 25, 2011.

* cited by examiner

*Primary Examiner* — David D Le
*Assistant Examiner* — Jacob S Scott
(74) *Attorney, Agent, or Firm* — McGinn IP Law Group, PLLC

(57) ABSTRACT

This invention provides a one-way clutch capable of hindering the generation of a coating between each sprag and each of inner and outer rings thereby preventing sprags and inner and outer rings from being damaged due to the slip therebetween and thereby lengthening the life of the engagement between each sprag and each of the inner and outer rings. The difference in surface hardness between each sprag (4) and each of an inner ring (2) and an outer ring (3) is set to be larger than a hardness of Rockwell C-scale HRC0 and to be equal to or smaller than HRC15.

6 Claims, 1 Drawing Sheet

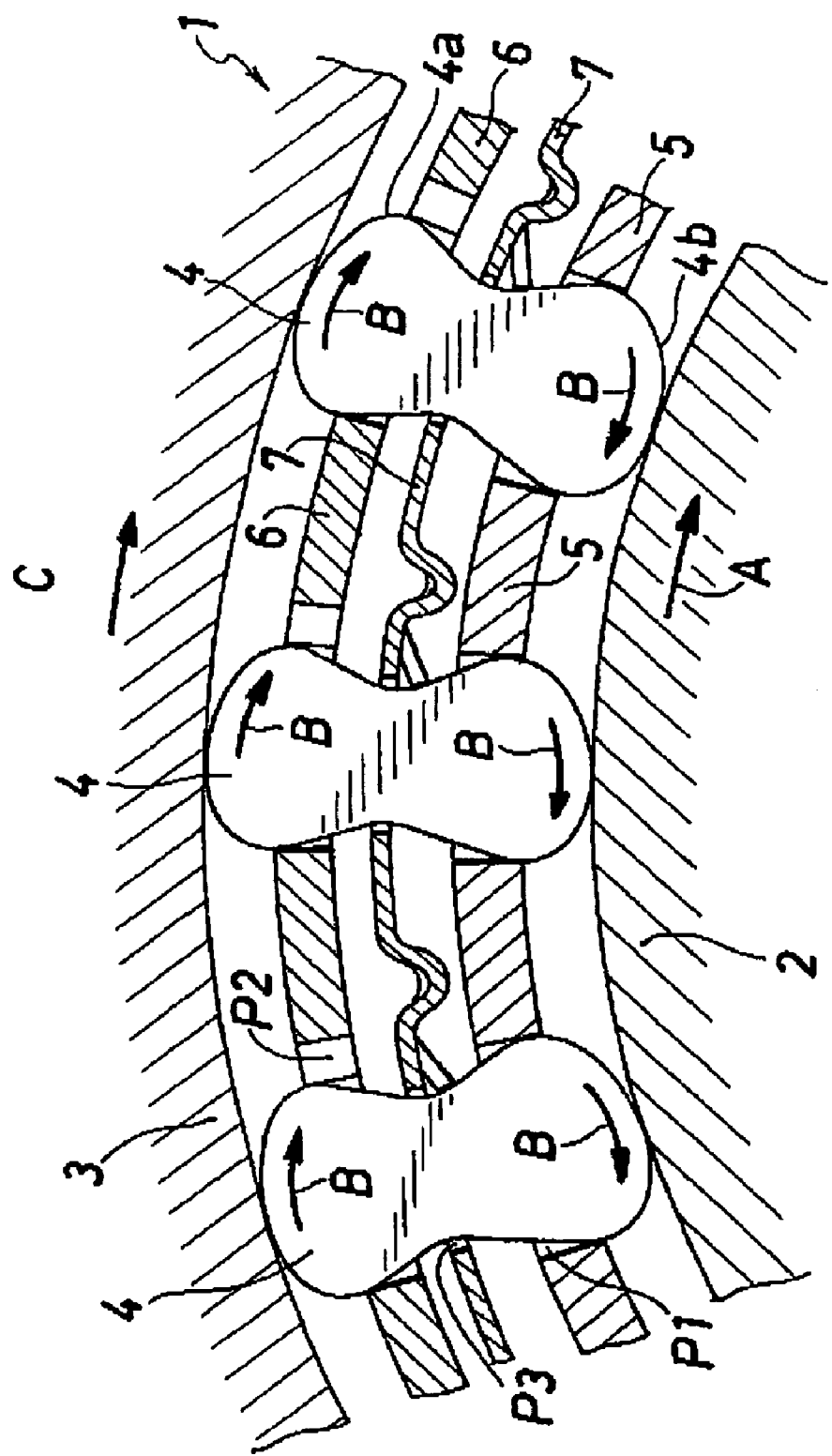

ONE-WAY CLUTCH

TECHNICAL FIELD

This invention relates to a one-way clutch for use in a power transmission device, such as an automobile transmission mechanism, and, more particularly, to a one-way clutch using a sprag.

BACKGROUND ART

Hitherto, as the one-way clutch using a sprag, a one-way clutch has been known, wherein a plurality of cam surfaces respectively put into contact with an outer circumferential surface of an inner ring and an inner circumferential surface of an outer ring, a cage in which a plurality of pockets for accommodating individual sprags are formed in order to regulate the mutual circumferential positions of the plurality of sprags, and a ribbon spring that has pockets formed to respectively accommodate the sprags and that urges the sprags in a direction in which each of the inner ring and the outer ring is locked are arranged in an annular space formed between the inner ring and the outer ring. Further, it has been also known that the higher the hardness of each of the sprags and the inner and outer rings becomes, the abrasion resistance of the one-way clutch is enhanced. In the case of a one-way clutch of this type, sometimes, lubrication is performed using a lubricant that contains a friction adjusting agent. For example, a one-way clutch for use in an automobile starting device (starter) utilizes engine oil as lubricating oil. Recent engine oil contains a friction adjusting agent (molybdenum) for reducing friction.

Patent Document 1: JP-A-2001-330062

DISCLOSURE OF THE INVENTION

Problems that the Invention is to Solve

In the case of the aforementioned clutch, sometimes, the surface hardness of the sprags is set to be equal to that of the inner and outer rings in order to improve abrasion resistance. This makes abrasion hard to occur between each sprag and each of the inner and outer rings. Thus, a coating of the friction-adjusting-agent-containing lubricant agent is easily generated. In addition, a coating thickness easily increases. Consequently, a slip is caused between each sprag and the outer or inner ring. Accordingly, predetermined torque (i.e., a turning force) cannot be transmitted. That is, the aforementioned one-way clutches have problems that a time required to damage the one-way clutch is determined by a time required to generate a coating, and that the time required to generate a coating is extremely short, as compared with such a time in the case of other conventional clutches.

An object of this invention is to provide a one-way clutch capable of hindering the generation of a coating between each sprag and each of inner and outer rings thereby preventing the sprags and the inner and outer rings from being damaged due to a slip caused therebetween and thereby lengthening the life of the engagement between each sprag and each of the inner and outer rings.

Means for Solving the Problems

According to this invention, there is provided a one-way clutch in which an inner ring and an outer ring, a plurality of sprags each having cam surfaces formed to be respectively brought into contact with an outer circumferential surface of the inner ring and an inner circumferential surface of the outer ring, a cage having a plurality of pockets formed to accommodate individually the sprags to regulate a mutual position in a circumferential direction of each of said sprags, and a ribbon spring that has pockets formed to respectively accommodate the sprags and that urges the sprags in a direction in which the inner ring and the outer ring are locked, are arranged. This one-way clutch is characterized in that a difference in surface hardness between each sprag and each of an inner ring and an outer ring is set to be larger than a hardness of Rockwell C-scale HRC0 and to be equal to or smaller than HRC15.

Each of the sprags and the inner and outer rings is made of metal, e.g., steel. The surface hardness of each of the sprags and the inner and outer rings is adjusted by using the same material as the material of each of the sprags and the inner and outer rings, and by changing heat treatment conditions. However, a material differing from that of each of the sprags can be used as that of each of the inner and outer rings.

The surface hardness of the sprags can be relatively high, while that of the inner and outer rings can be relatively low. Alternatively, the surface hardness of the sprags can be relatively low, while that of the inner and outer rings can be relatively high. The difference in hardness between each sprag and each of the inner and outer rings cannot be zero. It is not preferable that the difference in hardness is larger than HRC15. This is because the member having a low hardness is worn hard. More preferably, the difference in hardness between each sprag and each of the inner and outer rings is set so as to be equal to or higher than HRC1 and as to be equal to or lower than HRC10.

This one-way clutch exerts more effect in an environment in which engine oil containing a friction adjusting agent (molybdenum) is utilized as a lubricant.

When the inner ring is rotated in one direction in the one-way clutch, each sprag comes into friction contact with the inner ring. Consequently, each sprag is moved so as to tilt in a direction in which each sprag is erected while urged by elasticity of the ribbon spring. Then, each sprag bites in the inner and outer rings and is locked. Thus, the inner and outer rings are connected by each sprag integrally rotatably with each other. Due to this connection between the inner and outer rings, torque is transmitted from the inner ring to the outer ring via the sprags. When the inner ring rotates in a direction opposite to the aforementioned one direction, each sprag is moved against the elasticity of the ribbon spring so as to tilt in a direction opposite to the aforementioned direction in which each sprag is erected. Thus, the biting of each sprag into the inner and outer rings is released to enable a relative rotation between the inner and outer rings. Accordingly, the force of torque is not transmitted to the outer ring.

Hitherto, the abrasion (or life) has been improved by raising the hardness of each of the sprags and the inner and outer rings. However, this conventional technique has the following problems. That is, in a case where a lubricant, to which molybdenum is added, is used for lubricating the one-way clutch, molybdenum is absorbed onto or mechanically pushed against a metal surface at a metallic part of contact between the cam surface of each sprag and each of the inner and outer rings. Alternatively, a chemical reaction is caused so that a coating formed of a molybdenum compound layer, such as a molybdenum disulfide layer, is generated at the metallic part of contact. Consequently, the molybdenum compound layer reduces the coefficient of friction between each sprag and each of the inner and outer rings. When the coefficient of friction between each sprag and each of the inner and outer rings is reduced, the outer surface of each sprag slips on the raceway surface of each of the inner and outer rings. Thus, the transmission of torque becomes impossible. Even when no mechanical change (breakage and abrasion) occurs, the function (torque transmission) of the one-way clutch cannot be fulfilled.

However, in a case where the generation of a coating is hindered by making the cam surface of each sprag or the inner or outer ring easily wear down, the reduction in the coefficient of friction of each sprag or the inner or outer ring can be prevented. Thus, torque can favorably be transmitted from the inner ring to the outer ring. That is, the invention reduces the surface hardness of one of each sprag and each of the inner and outer rings thereby to make the cam surface of each sprag or the inner or outer ring easily wear down and to hinder the generation of a coating. In addition, the invention hinders the generation of a coating on a higher hardness side surface of each sprag or the inner or outer ring using generated abrasion powder.

It is more preferable that the lubricant is lubricating oil containing a friction adjusting agent, and that one of the surface hardness of each of the sprags and that of each of the inner and outer rings is set at HRC55 to HRC65, while the other surface hardness is set at HRC45 to HRC55.

Advantages of the Invention

According to the one-way clutch of this invention, the generation of a coating between each sprag and each of the inner and outer rings is hindered. Thus, reduction in the coefficient of friction and loss of the function (torque transmission) of the one-way clutch due to the slip therebetween can be prevented. Consequently, the life of the engagement between each sprag and each of the inner and outer rings can be lengthened. In addition, variation in the life of the engagement of each sprag can be reduced by preventing the loss of the function of the one-way clutch.

BRIEF DESCRIPTION OF THE DRAWING

The FIGURE is a transversally cross-sectional view illustrating a locked state of a one-way clutch according to the invention.

BEST MODE FOR CARRYING OUT THE INVENTION

Hereinafter, this invention is described with reference to the accompanying drawing.

The FIGURE illustrates a one-way clutch according to this invention.

This one-way clutch (1) includes an inner ring (2) and an outer ring (3), a plurality of sprags (4) each having cam surfaces (4a) (4b) formed to be respectively brought into contact with an outer circumferential surface of the inner ring (2) and an inner circumferential surface of the outer ring (3), an inner cage (5) and an outer cage (6) each having a plurality of pockets (P1) (P2) accommodating individually the sprags (4) to regulate mutual positions in a circumferential direction of the sprags (4), and a ribbon spring (7) that is placed between the inner cage (5) and the outer cage (6), that has pockets (P3) respectively accommodating the sprags (4), and that urges the sprags (4) in a direction, in which the inner ring (2) and the outer ring (3) are locked.

The number of the pockets (P1) (P2) formed in each of the inner cage (5) and the outer cage (6) is equal to that of the pockets (P3) formed in the ribbon spring (7). The pockets (P1) (P2) (P3) formed in each of the inner cage (5), the outer cage (6), and the ribbon spring (7) are formed at uniform intervals in the circumferential direction.

The sprags (4) are formed such that the surface hardness thereof ranges from HRC49 to HRC51. The inner ring (2) and the outer ring (3) are formed such that the surface hardness thereof ranges from HRC59 to HRC61. Accordingly, the difference in surface hardness between each sprag (4) and each of the inner ring (2) and the outer ring (3) is set at HRC8 to HRC12. That is, the surface hardness of the sprags (4) is lowered to thereby make the sprags (4) easily wear down. Consequently, the generation of a coating can be hindered. Further, the generation of a coating on each of the inner ring (2) and the outer ring (3) can be hindered using generated abrasion powder.

According to this one-way clutch (1), when the inner ring (2) is rotated clockwise as indicated by arrow A shown in the FIGURE, each sprag (4) comes into friction contact with the inner ring (2). Consequently, each sprag (4) is moved so as to tilt in a direction in which each sprag (4) is erected while urged by the elasticity of the ribbon spring (7). Then, each sprag (4) bites in the inner ring (2) and the outer ring (3) and is locked. Thus, the inner ring (2) and the outer ring (3) are connected by each sprag (4) integrally rotatably with each other. Due to this connection between the inner and outer rings, torque is transmitted from the inner ring (2) to the outer ring (3) via the sprags (4). In a case where the locked state is kept maintained, the sprags (4), the inner ring (2) and the outer ring (3) rotate integrally with one another in directions of arrows A and C.

When the inner ring (2) rotates in a direction opposite to the direction of arrow A, each sprag (4) is inclined from a state illustrated in the FIGURE against the elasticity of the ribbon spring (7) such that an upper part of each sprag (4) is tilted rightwardly, and a lower part of each sprag (4) is tilted leftwardly, as indicated by arrow B, i.e., each sprag (4) is inclined in a direction opposite to the direction in which each sprag (4) bites in the inner ring (2) and the outer ring (3). Then, each sprag (4) performs idle running, without biting in the inner and outer rings, to enable the relative rotation between the inner ring (2) and the outer ring (3). Consequently, torque is not transmitted to the outer ring (3). In a case where the locked state is kept maintained, the inner ring (2) rotates in a direction opposite to the direction of arrow A, while the outer ring (3) rotates in the direction of arrow C.

Thus, a direction, in which each sprag (4) is inclined in an annual space, is changed according to a direction in which the inner ring (2) rotates. Consequently, positions, at which cam surfaces (4a) (4b) of each sprag (4) abut against the inner ring (2) and the outer ring (3), respectively, are changed. Accordingly, each sprag (4) is brought into a locked state and an idling state. Each sprag (4) easily wears down, so that the generation of a coating is hindered. Thus, in the locked state, the inner circumferential surface of the outer ring (3) and the cam surface (4a) of each sprag (4) are hard to slip on each other. Further, the outer circumferential surface of the inner ring (2) and the cam surface (4b) of each sprag (4) are hard to slip on each other. The inner ring (2) and the outer ring (3) are made to rotate easily and integrally with each other. In addition, a high-hardness coating of each of the inner ring (2) and the outer ring (3) is removed by abrasion powder generated due to the abrasion of each sprag (4). Accordingly, this facilitates the integral rotation of the inner ring (2) and the outer ring (3).

In the description of the aforementioned embodiment, an example has been described, in which each sprag (4) is held by the inner cage (5) and the outer cage (6) and in which the ribbon spring (7) is disposed between the inner cage (5) and the outer cage (6). However, the invention can be applied to a one-way clutch of a structure in which each sprag (4) is held by a single cage and in which the ribbon spring (7) is arranged inside the cage. Further, in the description of the aforementioned embodiment, it has been described that the difference in surface hardness between each sprag (4) and each of the inner ring (2) and the outer ring (3) is set at HRC8 to HRC12. However, it is sufficient that the difference in surface hardness between each sprag (4) and each of the inner ring (2) and the outer ring (3) is larger than HRC0 and is equal to or less than HRC15.

INDUSTRIAL APPLICABILITY

According to the one-way clutch of this invention, the generation of a coating between each sprag and each of the inner and outer rings is hindered. Thus, reduction in the coefficient of friction and loss of the function (torque transmission) of the one-way clutch due to the damage of each sprag and each of the inner and outer rings caused by the slip therebetween can be prevented. Consequently, the life of the engagement between each sprag and each of the inner and outer rings can be lengthened. In addition, variation in the life of the engagement of each sprag can be reduced by preventing the loss of the function of the one-way clutch.

The invention claimed is:

1. A one-way clutch comprising:
an inner ring and an outer ring;
a plurality of sprags each including cam surfaces formed to be respectively brought into contact with an outer circumferential surface of said inner ring and an inner circumferential surface of said outer ring;
a cage including a plurality of pockets formed to accommodate individually said sprags to regulate a mutual position in a circumferential direction of each of said sprags; and
a ribbon spring that includes pockets formed to respectively accommodate said sprags and that urges said sprags in a direction in which said inner ring and said outer ring are locked,
wherein a difference in surface hardness between each sprag and each of an inner ring and an outer ring is in a range of HRC8 to HRC12 such that a surface hardness of one of each sprag and each of the inner ring and the outer ring is reduced thereby to make the cam surface of each sprag or the inner or outer ring wear down and to hinder the generation of coating.

2. The one-way clutch according to claim 1, wherein one of the surface hardness of each of the sprags and that of each of the inner and outer rings is set at HRC55 to HRC65, and
wherein the other surface hardness is set at HRC45 to HRC55.

3. The one-way clutch according to claim 1, further comprising a lubricant disposed between the inner ring and the outer ring, the lubricant containing a friction adjusting agent.

4. The one-way clutch according to claim 3, wherein the friction adjusting agent comprises molybdenum.

5. The one-way clutch according to claim 1, wherein the sprags comprise a surface hardness greater than a surface hardness of the inner ring and the outer ring.

6. The one-way clutch according to claim 1, wherein the inner ring and the outer ring comprise a surface hardness greater than a surface hardness of the sprags.

\* \* \* \* \*